US011652917B2

(12) United States Patent
Roderick et al.

(10) Patent No.: US 11,652,917 B2
(45) Date of Patent: *May 16, 2023

(54) SYSTEMS AND METHODS FOR AUTHENTICATION AND FRAUD DETECTION

(71) Applicant: Verint Americas Inc., Alpharetta, GA (US)

(72) Inventors: Jeremy Robert Roderick, Myrtle Beach, SC (US); Brian Patrick Carman, Spring, TX (US); David Warren Singer, Indianapolis, IN (US); Daniel Thomas Spohrer, Alpharetta, GA (US); Damian Smith, Epsom (GB); Tim McCurry, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,464

(22) Filed: Aug. 10, 2021

(65) Prior Publication Data

US 2021/0368041 A1 Nov. 25, 2021

Related U.S. Application Data

(63) Continuation of application No. 16/905,111, filed on Jun. 18, 2020, now Pat. No. 11,115,521.
(Continued)

(51) Int. Cl.
*H04M 1/64* (2006.01)
*H04M 3/22* (2006.01)
(Continued)

(52) U.S. Cl.
CPC ........... *H04M 3/2281* (2013.01); *G10L 17/04* (2013.01); *G10L 17/06* (2013.01);
(Continued)

(58) Field of Classification Search
CPC .... H04M 3/56; H04M 3/2281; H04M 3/5183; H04M 3/5166; H04M 3/42221;
(Continued)

(56) References Cited

U.S. PATENT DOCUMENTS 4,653,097 A 3/1987 Watanabe et al.
4,823,380 A 4/1989 Kohen et al.
(Continued)

FOREIGN PATENT DOCUMENTS

DE 202008007520 8/2008
EP 0598469 5/1994
(Continued)

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Md S Elahee
(74) *Attorney, Agent, or Firm* — Meunier Carlin & Curfman LLC (57) ABSTRACT

Systems and methods are provided to stop both external and internal fraud, ensure correct actions are being followed, and information is available to fraud teams for investigation. The system includes components that can address: 1) behavioral analytics (ANI reputation, IVR behavior, account activity)—this gives a risk assessment event before a call gets to an agent; 2) fraud detection—the ability to identify, in real time, if a caller is part of a fraudster cohort' and alert the agent and escalate to the fraud team; 3) identity authentication—the ability to identify through natural language if the caller is who they say they are; and 4) two factor authentication—the ability to send a text message to the caller and
(Continued)

automatically process the response and create a case in the event of suspected fraud.

19 Claims, 9 Drawing Sheets

Related U.S. Application Data (60) Provisional application No. 62/864,169, filed on Jun. 20, 2019.

(51) Int. Cl.
*G10L 17/04* (2013.01)
*G10L 17/06* (2013.01)
*H04M 3/42* (2006.01)
*H04M 3/51* (2006.01)

(52) U.S. Cl.
CPC ..... *H04M 3/42221* (2013.01); *H04M 3/5183* (2013.01); *H04M 2203/6009* (2013.01); *H04M 2203/6027* (2013.01); *H04M 2203/6045* (2013.01); *H04M 2203/6054* (2013.01)

(58) Field of Classification Search
CPC ...... H04M 3/382; H04M 3/385; G06Q 40/02; G06Q 20/4016; G06K 9/00536; G10L 17/04; G10L 17/06; H04L 63/0492
See application file for complete search history.

(56) References Cited

U.S. PATENT DOCUMENTS

| | | |
|---|---|---|
| 4,864,566 A | 9/1989 | Chauveau |
| 4,930,888 A | 6/1990 | Freisleben et al. |
| 5,027,407 A | 6/1991 | Tsunoda |
| 5,222,147 A | 6/1993 | Koyama |
| 5,293,452 A | 3/1994 | Picone et al. |
| 5,638,430 A | 6/1997 | Hogan et al. |
| 5,805,674 A | 9/1998 | Anderson, Jr. |
| 5,907,602 A | 5/1999 | Peel et al. |
| 5,946,654 A | 8/1999 | Newman et al. |
| 5,963,908 A | 10/1999 | Chadha |
| 5,999,525 A | 12/1999 | Krishnaswamy et al. |
| 6,044,382 A | 3/2000 | Martino |
| 6,145,083 A | 11/2000 | Shaffer et al. |
| 6,266,640 B1 | 7/2001 | Fromm |
| 6,275,806 B1 | 8/2001 | Pertrushin |
| 6,427,137 B2 | 7/2002 | Petrushin |
| 6,480,825 B1 | 11/2002 | Sharma et al. |
| 6,510,415 B1 | 1/2003 | Talmor et al. |
| 6,539,352 B1 | 3/2003 | Sharma et al. |
| 6,587,552 B1 | 7/2003 | Zimmerman |
| 6,597,775 B2 | 7/2003 | Lawyer et al. |
| 6,915,259 B2 | 7/2005 | Rigazio |
| 7,006,605 B1 | 2/2006 | Morganstein et al. |
| 7,039,951 B1 | 5/2006 | Chaudhari et al. |
| 7,054,811 B2 | 5/2006 | Barzilay |
| 7,106,843 B1 | 9/2006 | Gainsboro et al. |
| 7,130,800 B1 | 10/2006 | Currey et al. |
| 7,158,622 B2 | 1/2007 | Lawyer et al. |
| 7,212,613 B2 | 5/2007 | Kim et al. |
| 7,299,177 B2 | 11/2007 | Broman et al. |
| 7,386,105 B2 | 6/2008 | Wasserblat |
| 7,403,922 B1 | 7/2008 | Lewis et al. |
| 7,539,290 B2 | 5/2009 | Ortel |
| 7,657,431 B2 | 2/2010 | Hayakawa |
| 7,660,715 B1 | 2/2010 | Thambiratnam |
| 7,668,769 B2 | 2/2010 | Baker et al. |
| 7,693,965 B2 | 4/2010 | Rhoads |
| 7,778,832 B2 | 8/2010 | Broman et al. |
| 7,822,605 B2 | 10/2010 | Zigel et al. |
| 7,908,645 B2 | 3/2011 | Varghese et al. |
| 7,940,897 B2 | 5/2011 | Khor et al. |
| 8,036,892 B2 | 10/2011 | Broman et al. |
| 8,073,691 B2 | 12/2011 | Rajakumar |
| 8,095,372 B2 | 1/2012 | Kuppuswamy et al. |
| 8,112,278 B2 | 2/2012 | Burke |
| 8,145,562 B2 | 3/2012 | Wasserblat et al. |
| 8,253,797 B1 | 8/2012 | Maali et al. |
| 8,311,826 B2 | 11/2012 | Rajakumar |
| 8,510,215 B2 | 8/2013 | Gutierrez |
| 8,515,025 B1 | 8/2013 | Hewinson |
| 8,537,978 B2 | 9/2013 | Jaiswal et al. |
| 8,566,904 B2 | 10/2013 | Pizano et al. |
| 8,887,269 B2 | 11/2014 | Teglia |
| 9,001,976 B2 | 4/2015 | Arrowood |
| 9,172,808 B2 | 10/2015 | Zeppenfeld et al. |
| 9,349,373 B1 | 5/2016 | Williams et al. |
| 10,121,488 B1 | 11/2018 | Drews et al. |
| 10,477,012 B2 | 11/2019 | Rao et al. |
| 2001/0026632 A1 | 10/2001 | Tamai |
| 2002/0022474 A1 | 2/2002 | Blom et al. |
| 2002/0099649 A1 | 7/2002 | Lee et al. |
| 2003/0009333 A1 | 1/2003 | Sharma et al. |
| 2003/0050780 A1 | 3/2003 | Rigazio |
| 2003/0050816 A1 | 3/2003 | Givens et al. |
| 2003/0063133 A1 | 4/2003 | Foote et al. |
| 2003/0097593 A1 | 5/2003 | Sawa et al. |
| 2003/0147516 A1 | 8/2003 | Lawyer et al. |
| 2003/0203730 A1 | 10/2003 | Wan et al. |
| 2003/0208684 A1 | 11/2003 | Camacho et al. |
| 2004/0029087 A1 | 2/2004 | White |
| 2004/0105006 A1 | 6/2004 | Lazo et al. |
| 2004/0111305 A1 | 6/2004 | Gavan et al. |
| 2004/0131160 A1 | 7/2004 | Mardirossian |
| 2004/0143635 A1 | 7/2004 | Galea |
| 2004/0164858 A1 | 8/2004 | Lin |
| 2004/0167964 A1 | 8/2004 | Rounthwaite et al. |
| 2004/0169587 A1 | 9/2004 | Washington |
| 2004/0203575 A1 | 10/2004 | Chin et al. |
| 2004/0240631 A1 | 12/2004 | Broman et al. |
| 2004/0257444 A1 | 12/2004 | Maruya et al. |
| 2005/0010411 A1 | 1/2005 | Rigazio |
| 2005/0043014 A1 | 2/2005 | Hodge |
| 2005/0076084 A1 | 4/2005 | Loughmiller et al. |
| 2005/0125226 A1 | 6/2005 | Magee |
| 2005/0125339 A1 | 6/2005 | Tidwell et al. |
| 2005/0185779 A1 | 8/2005 | Toms |
| 2005/0273442 A1 | 12/2005 | Bennett et al. |
| 2006/0013372 A1 | 1/2006 | Russell |
| 2006/0106605 A1 | 5/2006 | Saunders et al. |
| 2006/0107296 A1 | 5/2006 | Mock et al. |
| 2006/0149558 A1 | 7/2006 | Kahn |
| 2006/0161435 A1 | 7/2006 | Atef et al. |
| 2006/0212407 A1 | 9/2006 | Lyon |
| 2006/0212925 A1 | 9/2006 | Shull et al. |
| 2006/0248019 A1 | 11/2006 | Rajakumar |
| 2006/0251226 A1 | 11/2006 | Hogan et al. |
| 2006/0277043 A1 | 12/2006 | Tomes et al. |
| 2006/0282660 A1 | 12/2006 | Varghese et al. |
| 2006/0285665 A1 | 12/2006 | Wasserblat et al. |
| 2006/0289622 A1 | 12/2006 | Khor et al. |
| 2006/0293891 A1 | 12/2006 | Pathuel |
| 2007/0041517 A1 | 2/2007 | Clarke et al. |
| 2007/0071206 A1 | 3/2007 | Gainsboro et al. |
| 2007/0074021 A1 | 3/2007 | Smithies et al. |
| 2007/0100608 A1 | 5/2007 | Gable et al. |
| 2007/0106517 A1 | 5/2007 | Cluff et al. |
| 2007/0124246 A1 | 5/2007 | Lawyer et al. |
| 2007/0244702 A1 | 10/2007 | Kahn et al. |
| 2007/0280436 A1 | 12/2007 | Rajakumar |
| 2007/0282605 A1 | 12/2007 | Rajakumar |
| 2007/0288242 A1 | 12/2007 | Spengler |
| 2008/0010066 A1 | 1/2008 | Broman et al. |
| 2008/0052164 A1 | 2/2008 | Abifaker |
| 2008/0114612 A1 | 5/2008 | Needham et al. |
| 2008/0181417 A1 | 7/2008 | Pereg et al. |
| 2008/0195387 A1 | 8/2008 | Zigel et al. |
| 2008/0222734 A1 | 9/2008 | Redlich et al. |
| 2009/0033519 A1 | 2/2009 | Shi et al. |
| 2009/0046841 A1 | 2/2009 | Hodge |
| 2009/0059007 A1 | 3/2009 | Wagg et al. |
| 2009/0106846 A1 | 4/2009 | Dupray et al. |

(56) References Cited

U.S. PATENT DOCUMENTS

| | | |
|---|---|---|
| 2009/0116703 A1 | 5/2009 | Schultz |
| 2009/0119106 A1 | 5/2009 | Rajakumar et al. |
| 2009/0147939 A1 | 6/2009 | Morganstein et al. |
| 2009/0152343 A1 | 6/2009 | Carter et al. |
| 2009/0247131 A1 | 10/2009 | Champion et al. |
| 2009/0254971 A1 | 10/2009 | Herz et al. |
| 2009/0304374 A1 | 12/2009 | Fruehauf et al. |
| 2009/0319269 A1 | 12/2009 | Aronowitz |
| 2010/0086108 A1 | 4/2010 | Jaiswal et al. |
| 2010/0114744 A1 | 5/2010 | Gonen |
| 2010/0121644 A1 | 5/2010 | Glasser |
| 2010/0131273 A1 | 5/2010 | Aley-Raz et al. |
| 2010/0228656 A1 | 9/2010 | Wasserblat et al. |
| 2010/0303211 A1 | 12/2010 | Hartig |
| 2010/0305946 A1 | 12/2010 | Gutierrez |
| 2010/0305960 A1 | 12/2010 | Gutierrez |
| 2010/0329546 A1 | 12/2010 | Smith |
| 2011/0004472 A1 | 1/2011 | Zlokarnik |
| 2011/0026689 A1 | 2/2011 | Metz et al. |
| 2011/0069172 A1 | 3/2011 | Hazzani |
| 2011/0141276 A1 | 6/2011 | Borghei |
| 2011/0191106 A1 | 8/2011 | Khor et al. |
| 2011/0206198 A1 | 8/2011 | Freedman et al. |
| 2011/0255676 A1 | 10/2011 | Marchand et al. |
| 2011/0282661 A1 | 11/2011 | Dobry et al. |
| 2011/0282778 A1 | 11/2011 | Wright et al. |
| 2011/0320484 A1 | 12/2011 | Smithies et al. |
| 2012/0053939 A9 | 3/2012 | Gutierrez et al. |
| 2012/0054202 A1 | 3/2012 | Rajakumar |
| 2012/0072453 A1 | 3/2012 | Guerra et al. |
| 2012/0245941 A1 | 9/2012 | Cheyer |
| 2012/0249328 A1 | 10/2012 | Xiong |
| 2012/0253805 A1 | 10/2012 | Rajakumar et al. |
| 2012/0254243 A1 | 10/2012 | Zeppenfeld et al. |
| 2012/0263285 A1 | 10/2012 | Rajakumar et al. |
| 2012/0284026 A1 | 11/2012 | Cardillo et al. |
| 2013/0132091 A1 | 5/2013 | Skerpac |
| 2013/0163737 A1 | 6/2013 | Dement et al. |
| 2013/0197912 A1 | 8/2013 | Hayakawa et al. |
| 2013/0253919 A1 | 9/2013 | Gutierrez et al. |
| 2013/0283378 A1 | 10/2013 | Costigan et al. |
| 2013/0300939 A1 | 11/2013 | Chou et al. |
| 2014/0007210 A1 | 1/2014 | Murakami et al. |
| 2014/0214676 A1 | 7/2014 | Bukai |
| 2014/0222678 A1 | 8/2014 | Sheets et al. |
| 2014/0230032 A1 | 8/2014 | Duncan |
| 2014/0254778 A1 | 9/2014 | Zeppenfeld et al. |
| 2014/0334611 A1 | 11/2014 | Barnes et al. |
| 2015/0055763 A1 | 2/2015 | Guerra et al. |
| 2015/0381801 A1 | 12/2015 | Rajakumar et al. |
| 2016/0125884 A1 | 5/2016 | Timem et al. |
| 2016/0365095 A1 | 12/2016 | Lousky et al. |
| 2017/0118340 A1 | 4/2017 | Kumar et al. |
| 2017/0140760 A1 | 5/2017 | Sachdev |
| 2018/0014189 A1 | 1/2018 | Ellison et al. |
| 2018/0075454 A1 | 3/2018 | Claridge et al. |
| 2018/0082689 A1 | 3/2018 | Khoury et al. |
| 2018/0152445 A1 | 5/2018 | Ye et al. |
| 2018/0181741 A1 | 6/2018 | Whaley |
| 2019/0037081 A1 | 1/2019 | Rao et al. |
| 2019/0050545 A1 | 2/2019 | Keret et al. |

FOREIGN PATENT DOCUMENTS

| | | | |
|---|---|---|---|
| EP | 2437477 | 4/2012 | |
| EP | 3270618 A1 * | 1/2018 | ......... H04L 63/0492 |
| JP | 2004-193942 | 7/2004 | |
| JP | 2006-038955 | 9/2006 | |
| WO | 2000/077772 | 12/2000 | |
| WO | 2004/079501 | 9/2004 | |
| WO | 2006/013555 | 2/2006 | |
| WO | 2007/001452 | 1/2007 | |
| WO | 2010/116292 | 10/2010 | |
| WO | 2014/205227 | 12/2014 | |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Cohen, I., "Noise Spectrum Estimation in Adverse Environment: Improved Minima Controlled Recursive Averaging," IEEE Transactions on Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

ETSI TS 102 232-5 v2.1.1, "Lawful Interception (LI); Handover Interface and Service Specific Details (SSD) for IP delivery; Part 5: Service-specific details for IP Multimedia Services," Feb. 2007, 25 pages.

ETSI TS 102 657 v1.4.1, "Lawful Interception (LI); Retained data handling; Handover interface for the request and delivery of retained data," Dec. 2009, 92 pages.

Girardin, Fabien, et al., "Detecting air travel to survey passengers on a worldwide scale," Journal of Location Based Services, Oct. 28, 2009, 26 pages.

Hayes, M.H., "Statistical Digital Signal Processing and Modeling," J. Wiley & Sons, Inc., New York, 1996, 200 pages.

Lailler, C., et al., "Semi-Supervised and Unsupervised Data Extraction Targeting Speakers: From Speaker Roles to Fame?" Proceedings of the First Workshop on Speech, Language and Audio in Multimedia (SLAM), Marseille, France, 2013, 6 pages.

Meyer, Ulrike, et al., "On the Impact of GSM Encryption and Man-in-the-Middle Attacks on the Security of Interoperating GSM/UMTS Networks," IEEE, 2004, 8 pages.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Strobel, Daehyun, "IMSI Catcher," Seminararbeit Ruhr-Universitat Bochum, Chair for Communication Security, Prof. Dr.-Ing. Christof Paar, Jul. 13, 2007, 28 pages.

Vedaldi, Andrea, "An implementation of SIFT detector and descriptor," University of California at Los Angeles, 2006, 7 pages.

International Search Report and Written Opinion, dated Aug. 17, 2020, received in connection with corresponding International Patent Application No. PCT/US2020/038339.

* cited by examiner

SYSTEMS AND METHODS FOR AUTHENTICATION AND FRAUD DETECTION

CROSS-REFERENCE TO RELATED APPLICATIONS

The application is a continuation of U.S. patent application Ser. No. 16/905,111 filed on Jun. 18, 2020, entitled SYSTEMS AND METHODS FOR AUTHENTICATION AND FRAUD DETECTION, which claims the benefit of priority to U.S. Provisional Patent Application No. 62/864,169 filed on Jun. 20, 2019, entitled "SYSTEMS AND METHODS FOR AUTHENTICATION AND FRAUD DETECTION." The contents of both are hereby incorporated by reference in their entirety.

BACKGROUND

Companies such as credit card companies, financial institutions, insurance companies, healthcare companies, and governments incur loss due to fraudsters and fraud rings. Fraud rates are increasing, with identity theft, account takeover (including phishing attacks) and friendly fraud (chargebacks) the most prevalent threats. Fraud most often happens from an outside individual, but internal fraud also occurs. Much of the fraud can be traced back to the contact centers or call centers associated with the companies.

Conventional identify authentication (IA) and fraud detection (FD) solutions focus on either the IA or FD aspect, but not both. This is not sufficient as fraud continues to increase.

SUMMARY

Systems and methods are provided to stop both external and internal fraud, ensure correct actions are being followed, and information is available to fraud teams for investigation. Most IAFD solutions focus on either the IA or FD aspect. The disclosed systems contain components that can address: 1) behavioral analytics (ANI reputation, IVR behavior, account activity)—this gives a risk assessment event before a call gets to an agent; 2) fraud detection—the ability to identify, in real time, if a caller is part of a fraudster cohort' and alert the agent and escalate to the fraud team; 3) identity authentication—the ability to identify through natural language if the caller is who they say they are; and 4) two factor authentication—the ability to send a text message to the caller and automatically process the response and create a case in the event of suspected fraud.

All of these components may be combined into one solution that simultaneously reduces authentication friction for valid callers and automatic escalation for fraudsters. This results in both a higher satisfaction for callers due to easier authentications, and reduced costs and time for the call center due to less incorrect call escalations.

In an embodiment, a system for authenticating calls and for preventing fraud is provided. The system includes one or more processors and a memory communicably coupled to the one or more processors. The memory stores an analysis module, a biometrics module, an authentication module, and a fraud module. The analysis module includes instructions that when executed by the one or more processors cause the one or more processors to: receive a call through a first channel, wherein the call is associated with a customer and a speaker; based on one or more characteristics of the received call, the customer, or the channel, assign a score to the call; determine if the score satisfies a threshold; and if the score does not satisfy the threshold, flag the call as a fraudulent call. The biometrics module includes instructions that when executed by the one or more processors cause the one or more processors to: analyze voice data associated with the call to determine whether the speaker is a fraudulent speaker; and if the speaker is a fraudulent speaker, flag the call as a fraudulent call. The authentication module includes instructions that when executed by the one or more processors cause the one or more processors to: generate a first code; retrieve a profile associated with the customer; send the first code to the customer through a second channel indicated by the profile associated with the customer; receive a second code through the first channel; determine if the first code matches the second code; and if it is determined that the first code matches the second code, flag the call as an authenticated call.

Embodiments may include some or all of the following features. The analysis module may further include instructions that when executed by the one or more processors cause the one or more processors to: if the score satisfies the threshold, flag the call as an authenticated call. The biometrics module may further include instructions that when executed by the one or more processors cause the one or more processors to: if the speaker is not a fraudulent speaker, flag the call as an authenticated call. The authentication module may include instructions that when executed by the one or more processors cause the one or more processors to: if it is determined that the first code does not match the second code, flag the call as an authenticated call. The fraud module may include instructions that when executed by the one or more processors cause the one or more processors to: if the call is flagged as a fraudulent call; receive a recording of the call; process the recording to generate one or more voiceprints for the speaker associated with the call; and store the generated voiceprints. Analyzing voice data associated with the call to determine whether the speaker is a fraudulent speaker may include: retrieving voiceprints associated with fraudulent activities; determining if the voice data matches any of the voiceprints associated with fraudulent activities; and if the determined voice data matches any of the voiceprints associated with the fraudulent activities, flag the call as a fraudulent call. The biometrics module may further include instructions that when executed by the one or more processors cause the one or more processors to: retrieve one or more voiceprints associated with the customer; determine if the voice data matches any of the voiceprints associated with the customer; and if the determined voice data matches any of the voiceprints associated with the customer, flag the call as an authenticated call.

In an embodiment, a method for authenticating calls and for preventing fraud is provided. The method includes: receiving a call through a first channel, wherein the call is associated with a customer and a speaker; determine if there are one or more voiceprints associated with the customer; if it is determined that there are one or more voiceprints associated with the customer: retrieving the one or more voiceprints associated with the customer; determine if voice data associated with the call matches any of the one or more voiceprints associated with the customer; and if the voice data matches any of the one or more voiceprints associated with the customer, flag the call as an authenticated call.

Embodiments may include some or all of the following features. The method may further include: if the voice data does not match any of the one or more voiceprints associated with the customer, the call may be flagged as a fraudulent call. The method may further include: if it is determined that there are no voiceprints associated with the customer: generating a first code; retrieving a profile associated with the customer; sending the first code to the customer through a second channel indicated by the profile associated with the customer; receiving a second code through the first channel; determining if the first code matches the second code; and if it is determined that the first code matches the second code, flagging the call as an authenticated call. The method may further include: generating a voiceprint for the customer using voice data associated with the call; and associating the voiceprint with the customer.

In an embodiment, a method for authenticating calls and for preventing fraud is provided. The method includes: receiving a call through a first channel, wherein the call is associated with a customer and a speaker; based on one or more characteristics of the received call, the customer, or the channel, assigning a score to the call; determining if the score satisfies a threshold; and if the score does not satisfy the threshold, flagging the call as a fraudulent call; analyzing voice data associated with the call to determine whether the speaker is a fraudulent speaker; if the speaker is a fraudulent speaker, flagging the call as a fraudulent call; generating a first code; retrieving a profile associated with the customer; sending the first code to the customer through a second channel indicated by the profile associated with the customer; receiving a second code through the first channel; determining if the first code matches the second code; and if it is determined that the first code matches the second code, flagging the call as an authenticated call.

Embodiments may include some or all of the following features. The method may further include: if the score satisfies the threshold, flagging the call as an authenticated call. The method may further include: if the speaker is not a fraudulent speaker, flagging the call as an authenticated call. The method may further include: if it is determined that the first code does not match the second code, flagging the call as a fraudulent call. The method may further include: if the call is flagged as a fraudulent call: receiving a recording of the call; processing the recording to generate one or more voiceprints for the speaker associated with the call; and storing the generated one or more voiceprints. Analyzing voice data associated with the call to determine whether the speaker is a fraudulent speaker may include: retrieving voiceprints associated with fraudulent activities; determining if the voice data matches any of the voiceprints associated with fraudulent activities; and if the determined voice data matches any of the voiceprints associated with the fraudulent activities, flagging the call as a fraudulent call. The method may further include: retrieving one or more voiceprints associated with the customer; determine if the voice data matches any of the voiceprints associated with the customer; and if the determined voice data matches any of the voiceprints associated with the fraudulent activities, flagging the call as an authenticated call.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

An embodiment described herein provides behavioral analytics, fraud detection, identity authentication, and two factor authentication. Behavioral analytics (e.g., ANI reputation, IVR behavior, account activity) gives a risk assessment event before a call gets to an agent. Fraud detection provides the ability to identify, in real time, if a caller is part of a 'fraudster cohort' and alert the agent and escalate to the fraud team. Identity authentication provides the ability to identify through natural language if the caller is who they say they are. Two factor authentication provides the ability to send a text message to the caller and automatically process the response and create a case in the event of suspected fraud.

Figure 1:
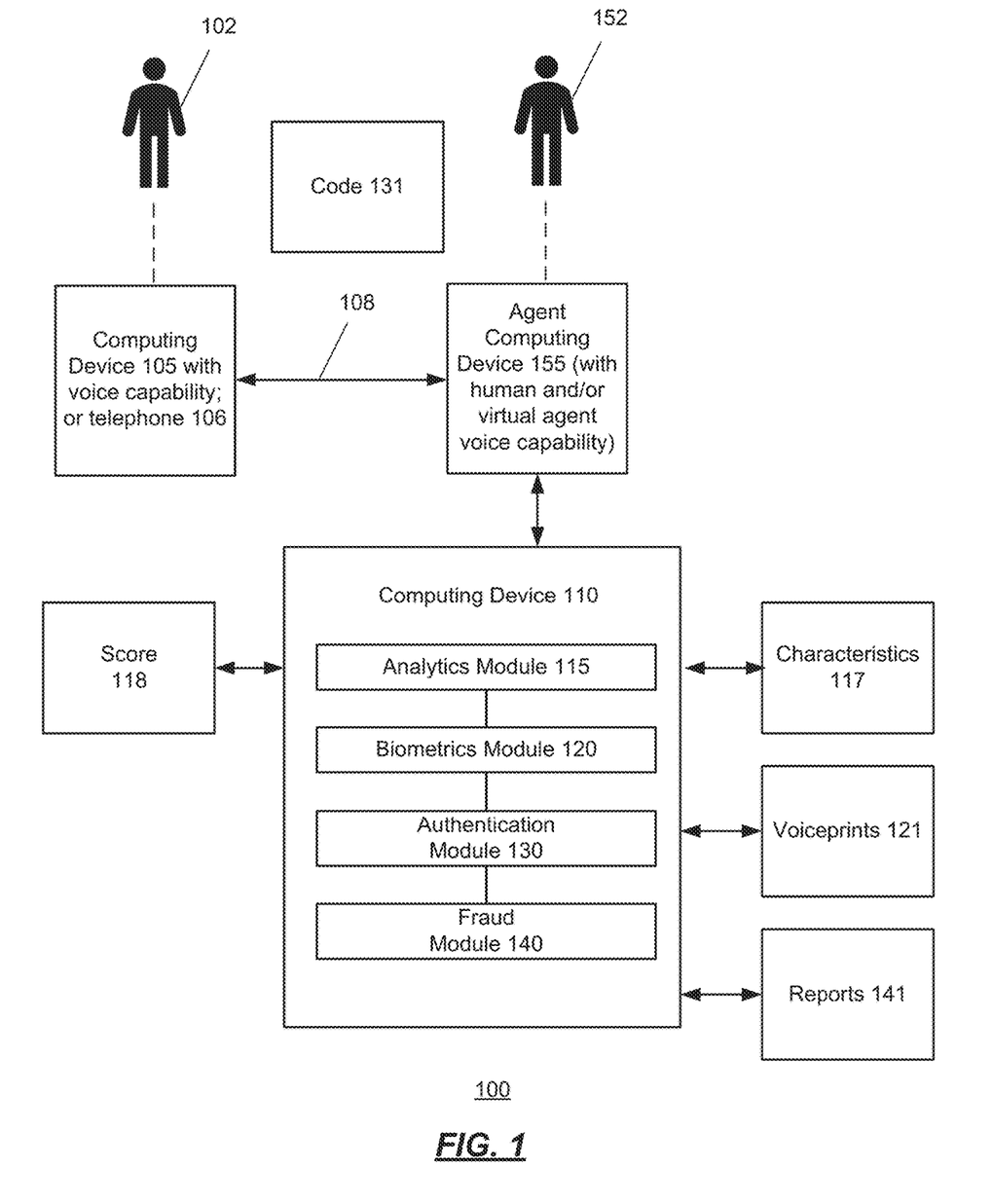
FIG. 1 is an illustration of an environment for authenticating callers and for providing fraud and intrusion detection

FIG. 1 is an illustration of an environment 100 for authenticating callers and for providing fraud and intrusion detection. The environment 100 may be implemented by a call center or any other entity that receives calls from customers or clients. A user 102 such as a customer may use a computing device 105 (or a telephone 106) to initiate a call with an agent 152 associated with the environment 100. The agent 152 may receive the call via a channel 108 such as a VOIP line, POTS line, or a cellular channel. Any channel suitable for voice communication may be used.

The agent 152 may receive the call from the customer on an agent computing device 155. The agent computing device 155 may be equipped with both human and virtual voice agent capabilities.

Besides the agent 152, the call may also be received (at the same time or later) by a computing device 110 associated with the call center environment 100. The computing device 110 may provide one or more call center services to the user 102 such as interactive voice response services ("IVR") where the user may be presented with an automated system that may determine the optimal agent 152 to direct the call, may determine the identity of the customer, or may retrieve other information from the customer in an automated way.

Figure 9:
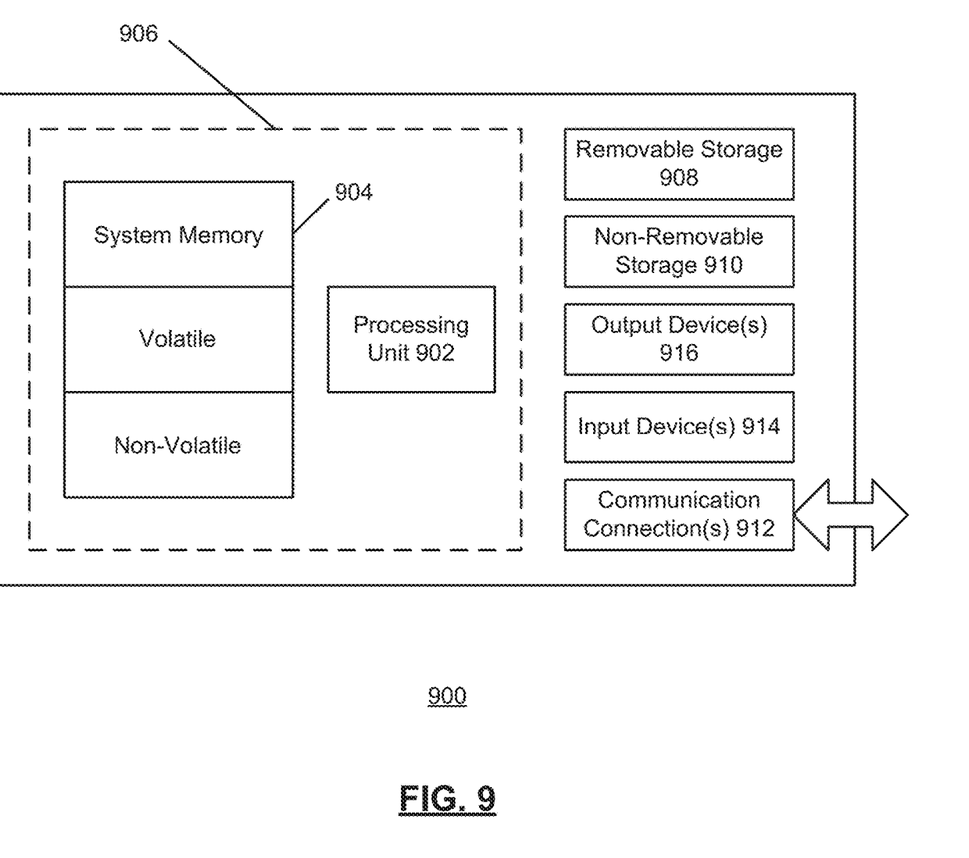
FIG. 9 shows an exemplary computing environment in which example embodiments and aspects may be implemented.

As may be appreciated, the computing device 105, agent computing device 155, and the computing device 110 may each be implemented by one or more general purpose computing devices 110 such as the computing device 900 illustrated with respect to FIG. 9.

In order to detect fraud, detect intrusions, and provide authentication with respect to one more calls and users 102, the computing device 110 may include one or more modules. As illustrated, these modules include an analytics model 115; a biometrics module 120; an authentication module 130; and a fraud module 140. More or fewer modules may be supported. Depending on the implementation, some or all of the modules 115, 120, 130, and 140 may be implemented the same computing device 110, or by some combination of computing devices 110. In addition, some or all of the modules 115, 120, 130, and 140 may be implemented by a cloud-based computing system. Furthermore, some or all of the modules 115, 120, 130, and 140 may be implemented in a call center.

The analytics module 115 may generate a score 118 for a current or received call. The score 118 may represent how likely it is that a particular call is associated with fraud (e.g., a known fraudster or fraudulent user) or is otherwise suspect. For example, the score 118 may be a 1-5 score where 1 represents a call that is not likely to be associated with fraud, and 5 represents a call that is very likely to be associated with fraud. Other scales or scoring methods may be used.

As will be described further below, the analytics module 115 may determine the score 118 for a call and may transmit the score 118 to the agent computing device 155 associated with the agent 152 that is handling the call. For example, the score 118 may be displayed to the agent 152 on a dashboard or other user-interface being viewed by the agent 152 during the call. The dashboard may display information about the call such as a (purported) name of the customer and any information determined for the customer by an IVR or the agent 152.

In some implementations, the analytics module 115 may generate the score 118 for the call using one or more characteristics 117 of the call. The characteristics of the call may include knowledge based characteristics 117 such as carrier information (e.g., is the carrier used by the caller associated with fraud), the channel 108 associated with the call (e.g., some channels such as VoIP may be more associated with fraud than landlines), country, city, or state of origin, and whether or not any ANI spoofing is detected or if the number used for the call is known to be spoofed or associated with fraud.

The characteristics 117 may further include reputation based characteristics 117 such as an account history associated with the number or customer, information from an ANI blacklist, previous indicators associated with the number or caller, and information associated with an escalating threat level (e.g., are fraud detections currently on the rise in the contact center?). The characteristics 117 may include behavior-based characteristics 117 learned about the caller by the IVR (or PBX) such as call flow actions, caller pattern probing, call velocity and frequency, and cross program detection. Other characteristics 117 may be used.

Depending on the embodiment, if the score 118 generated for a call or caller is above (or below) a threshold, the call may be flagged by the analytics module 115 as authenticated or otherwise unlikely to be associated with fraud. After being authenticated, the agent 152 may proceed with the business or purpose of the call without further authenticating the user 102.

If the score 118 generated for the call is below (or above) the threshold, the computing device 110 may continue to authenticate the call. In particular, the biometrics module 120 may process voice data associated with the call to determine if the speaker associated with the call is the customer that the speaker purports to be and may process the voice data to determine if the speaker matches any known fraudsters (i.e., fraudulent users). As used herein the term speaker is used to distinguish the user 102 speaking on the call from the term customer. The customer is the user 102 associated with the account and may be the user 102 that the speaker on the call purports to be. When the call is authenticated, the speaker and the customer are determined to be the same user 102.

When the speaker is connected to the agent 152, the agent 152 welcomes the speaker and asks the speaker to provide their customer name and account information. As this information is provided the biometrics module 120 processes the voice data in real-time using one or more voiceprints 121 that are associated with the customer. Depending on the embodiment, the biometrics module 120 may use passive voice biometrics which may not require the customer to actively enroll their voice. Instead, voiceprints 121 may be created automatically for a customer based on their voice data collected from a call. Any method for creating voiceprints 121 may be used.

If the biometrics module 120 determines that the voice data matches a voiceprint 121 associated with the customer (or a voiceprint associated with customers on a white list), then the biometrics module 120 may flag the call as authenticated and may proceed as described above. If the biometrics module 120 determines that the voice data does not match any voiceprint 121 associated with the customer (or there are no voiceprints associated with the customer), the biometrics module 120 may hand off processing of the call to the authentication module 130.

The biometrics module 120 may further retrieve voiceprints 121 associated with known fraudsters or fraudulent users. If the voice data associated with the call matches a voiceprint 121 associated with a known fraudulent user, then the biometrics module 120 may flag the call as being a fraudulent call.

The authentication module 130 may authenticate the speaker on the call using what is known as two factor authentication. In one implementation, the authentication module 130 may perform the two factor authentication by first determining a second channel 108 associated with the user 102. The second channel 108 may be different than the first channel 108 being used and may include mobile phones (i.e., text or SMS), email, etc. The second channel 108 may be determined from a profile associated with the user 102 (i.e., customer) or user account.

After determining the second channel 108, the authentication module 130 may generate a code 131 and may send the code 131 to the user 102 via the second channel 108. For example, if the second channel 108 is email, the authentication module 130 may send the code 131 to the user 102 at the email address associated with the user 102.

The authentication module 130 may then later receive a code 131 from the user 102 via the first channel 108 (i.e., the call). For example, the agent 152 may ask the user 102 to repeat the code 131 included in the email received via the second channel 108. Depending on the embodiment, the user 102 may speak the code 131 to the agent 152 or may provide the code 131 directly to the authentication module 130 via the internet. If the received code 131 matches the sent code 131 then the authentication module 130 may flag the call and user 102 as authenticated. After being authenticated, the agent 152 may proceed with the business or purpose of the call without further authenticating the user. If the received code 131 does not match the sent code 131, the authentication module 130 may flag the call as fraudulent.

Furthermore, after the authentication module 130 authenticates the user, additional fraud and authentication related steps may be performed by the computing device 110. For example, in scenarios where the biometrics module 120 was unable to authenticate the user 102 due to incomplete or non-existing voiceprints 121, the biometrics module 120 may attempt to generate one or more voiceprints 121 for the user 102. In some implementations, the biometrics module 120 may generate the one or more voiceprints 121 using the voice data provided by the user 102 at the beginning of the call. In other implementations, after the call has been completed, the biometrics module 120 may use voice data extracted from a recording of the call and may generate the voiceprints 121 from the voice data.

The fraud module 140 may process information related to calls marked or flagged as fraudulent to investigate whether the calls are fraudulent calls and to learn rules or other information that can be later used to identify fraudulent calls or users 102. Initially, when a call is marked or flagged as fraudulent, an indicator or other information may be displayed to the agent 152 to let them know that the call may be fraudulent. In addition, in response to the call being flagged as fraudulent, the agent 152 may be provided with questions to ask the speaker during the call. These questions may be selected to keep the speaker participating on the call and to collect additional information about the speaker that can be used by the fraud module 140 to both better determine if the call is fraudulent, and to update rules or characteristics that can be later used to identify fraudulent calls. Alternatively, or additionally, in response to the call being flagged as fraudulent, the call may be transferred to an agent 152 specially trained on how to deal with fraudulent calls.

After a call has been completed (or while the call is in progress), the fraud module 140 may be provided with information about the call (i.e., a case) such a recording of the call, any characteristics 117 of the call, and any information collected for the call by the IVR system. The fraud module 140 may then process the information and call recording to determine rules or other characteristics that are indicative of a fraudulent call. For example, the fraud module 140 may determine additional call characteristics 117 that may be used by the analytics module 115 to generate a score 118 for a call.

In some implementations the fraud module 140 may be associated with a fraud team. The fraud team may track fraudulent calls across multiple departments of a company or organization. This may help the organization identify fraudulent call trends in the organization and to possibly get ahead of a fraudulent caller that is calling multiple departments. The fraud team may ultimately determine whether or not a call was properly tagged as fraudulent.

The fraud module 140 may further generate one or more reports 141 based on the fraudulent calls identified by the fraud module 140. The reports 141 can be used to track, manage, and improve fraud practice for an organization. In some implementations, the reports 141 may indicate calls that were successfully identified as fraud, calls that were not successfully identified as fraud, as well as the number of voiceprints 121 (for users 102 or fraudsters) that have been collected by the system. The reports can be used for training and/or coaching agents 152 to reduce the overall training time.

Depending on the embodiment, a report 141 may include an alert for each call that is flagged or determined to be fraudulent. The reports 141 may include for each alert: 1) alert summary: score and threat level; channel information (phone number, carrier line type, chat, web, email, etc.); line risk indicator (carrier/line correlation with fraudulent activity); events (number of times application has been access via specified channel identifier); accounts (different accounts accessed via specified channel identifier); user active duration (days user has access the system via the indicated channel); spoof risk (level of threat that channel identifier has been spoofed); access to detailed information about alert; and 2) alert details: score and threat level; channel information; score report; state management (status); score history (chart shows risk score for channel identifier over time); events (additional details for each event where the channel identifier accessed the application); link back to call recording. Other information may be included for each alert in a report 141.

Figure 2:
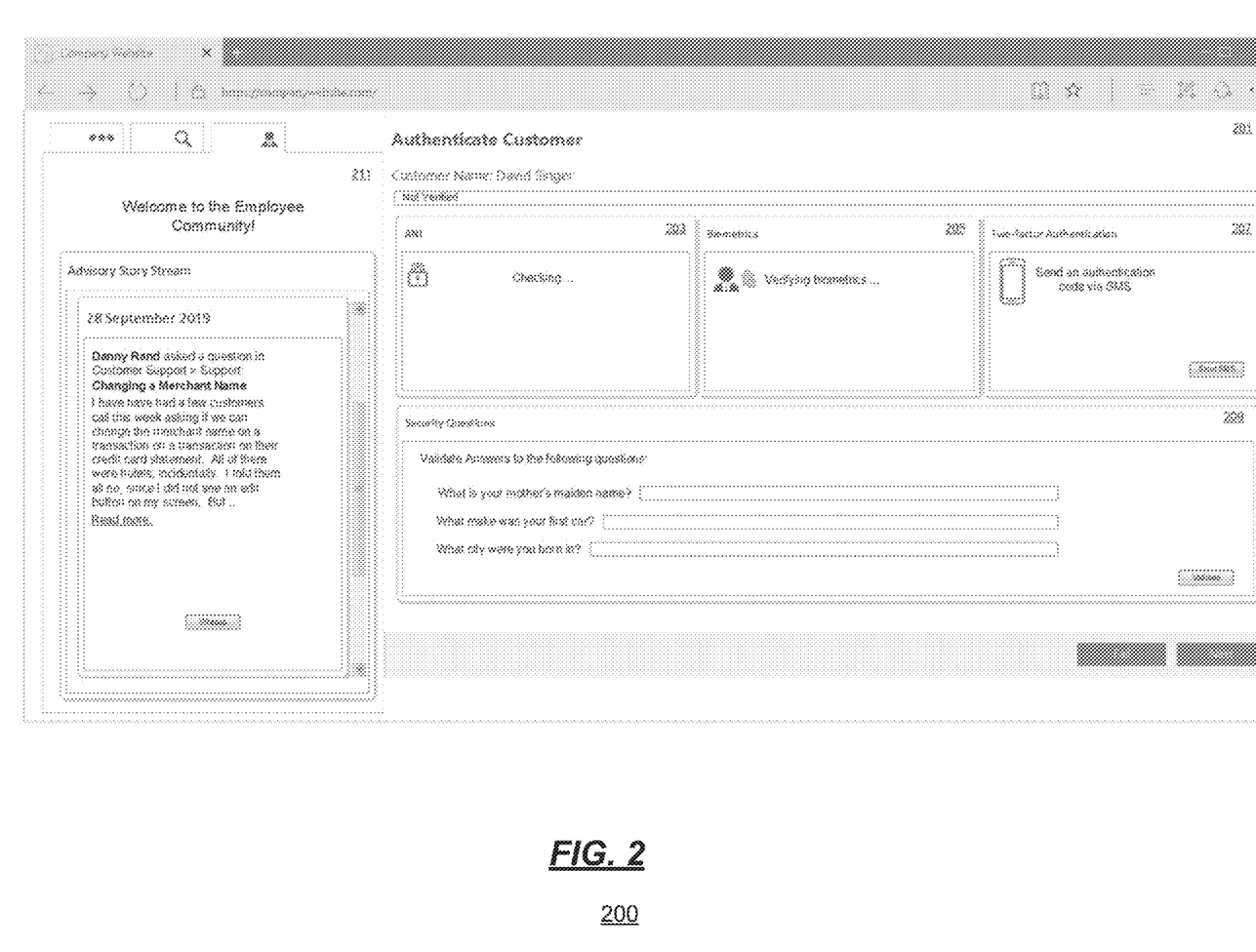
FIGS. 2-6 are illustrations of an example user-interface.

FIG. 2 is an illustration of an example user-interface 200. The user-interface 200 may be displayed to an agent 152 on their agent computing device 155 during a call with a user 102. As shown in a window 201, the agent 152 is on a call with a speaker (i.e., user 102) who purports to be the customer named "David Singer." The speaker may have provided the name David Singer during an IVR session that took place before the call was transferred to the agent 152. Because the customer has not yet been authenticated, the window 201 lists the speaker as "not verified."

The user-interface 200 further includes windows 203, 205, 207, and 209 that each correspond to another method or means of verifying or authenticating the speaker or customer. The window 203 includes verification based on call characteristics 117 such as ANI. The window 205 includes verification based on biometrics such as voiceprints 121. The window 207 includes verification using two factor authentication. The window 209 includes verification based on security questions associated with the user. Depending on the embodiment, the user-interface 200 further includes a window 211 that displays chats or other messages received from other agents 152. The agents 152 may use the window 211 to share observations and trends they are observing while handling calls.

Figure 3:
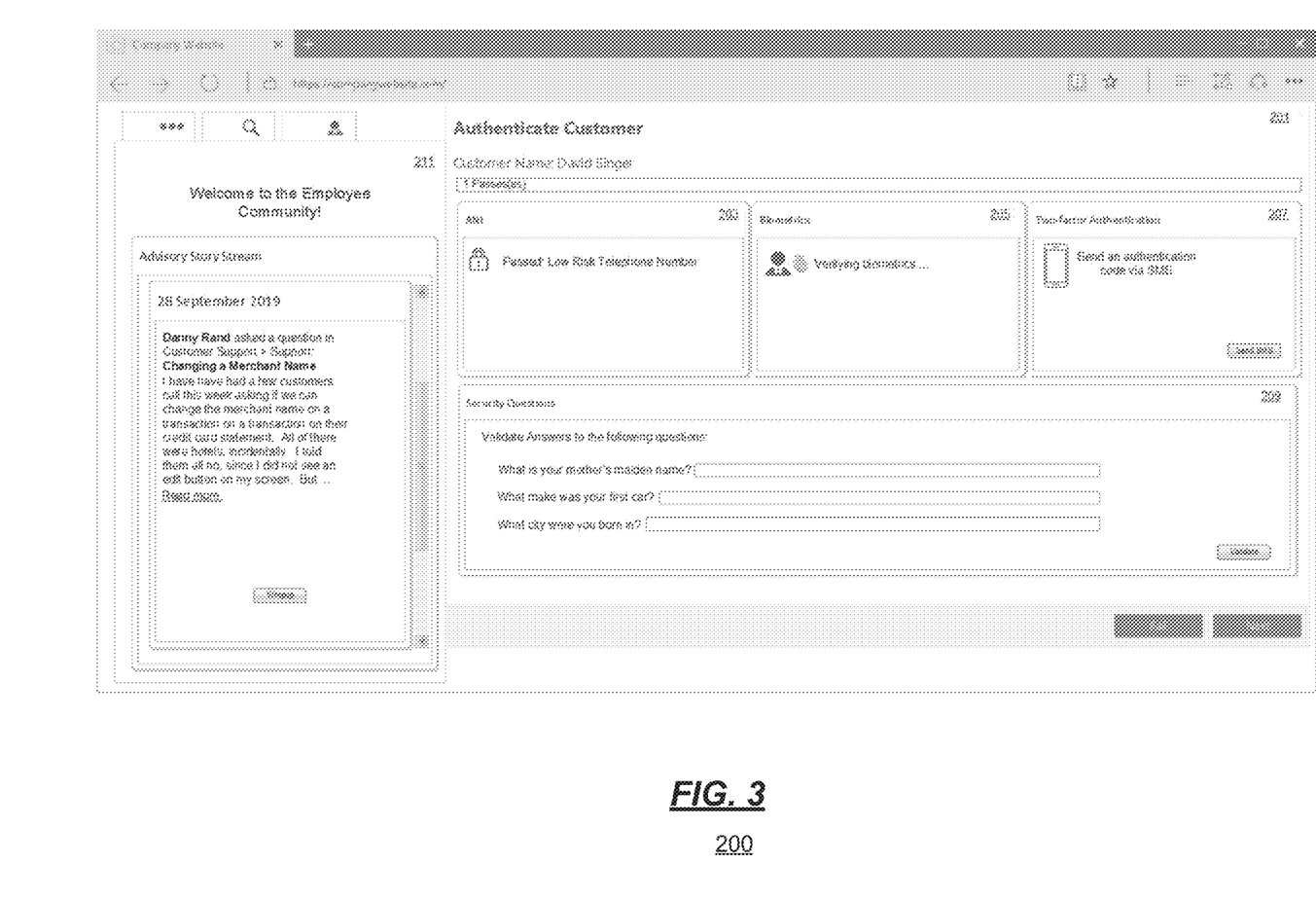

Continuing to FIG. 3, the analysis module 115 may have generated a score 118 for the call associated with the information displayed in the user-interface 200 based on the characteristics 117 associated with the call. In the example shown, the word "passed" has been displayed in the window 203 indicating to the agent 152 that the generated score 118 was above the threshold for calls and is therefore low risk. While the window 203 indicates that the score 118 was based on the ANI associated with the call, other characteristics 117 may be used by analysis module 115 to generate the score 118 including ANI velocity, carrier, line type, location, behavior (IVR), spoof detection, etc.

Figure 4:
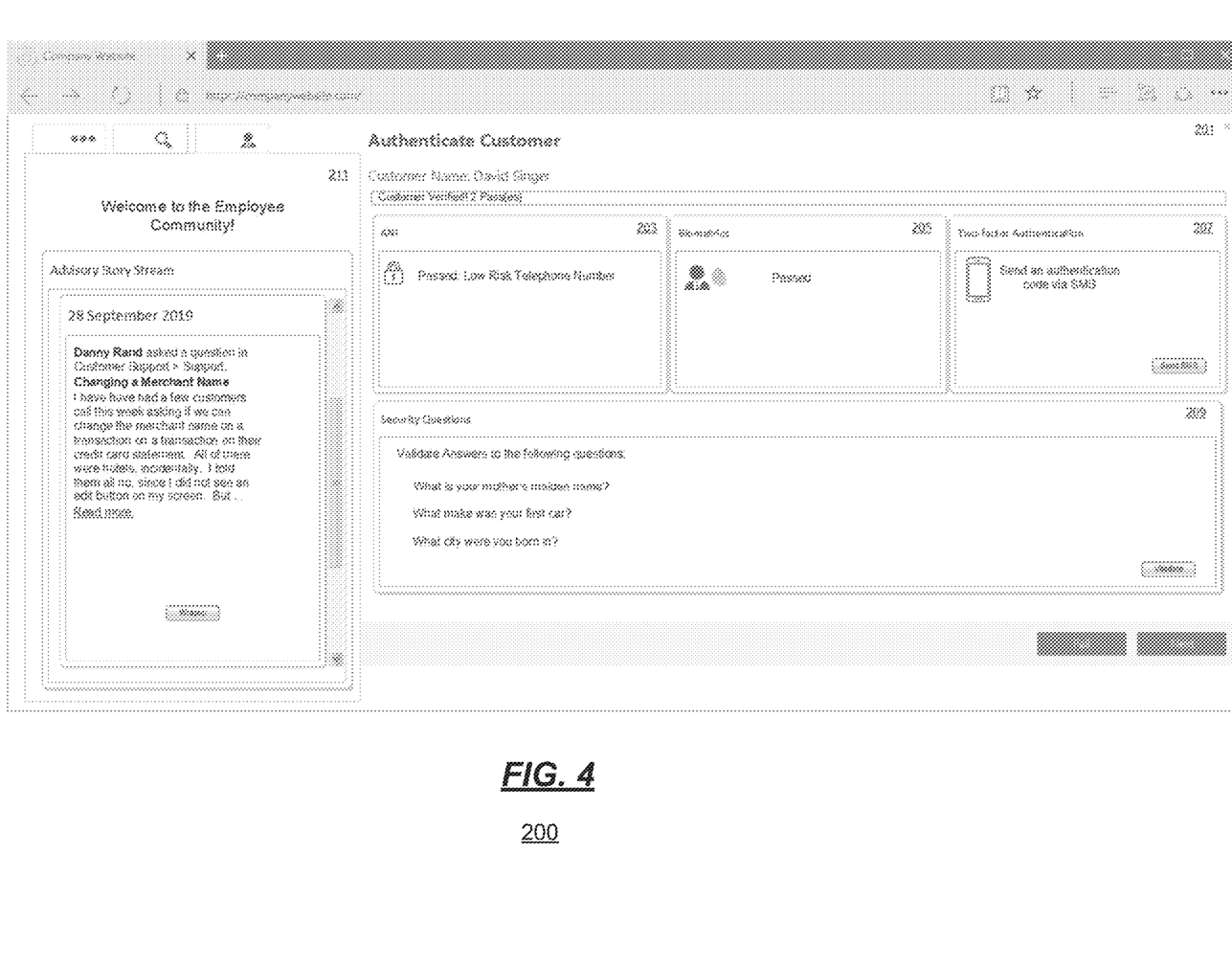

Continuing to FIG. 4, the biometrics module 120 may have performed a biometrics check on the speaker associated with the call. In the example shown, the word "passed" has been displayed in the window 205 indicating to the agent 152 that the speaker has passed the biometric analysis. Depending on the embodiment, the speaker may pass if the voice data associated with the call does not match against a voiceprint 121 associated with a known fraudster, or the speaker may pass if the voice data associated with the call matches against a voiceprint 121 associated with the purported customer name (i.e., "David Singer").

Figure 5:
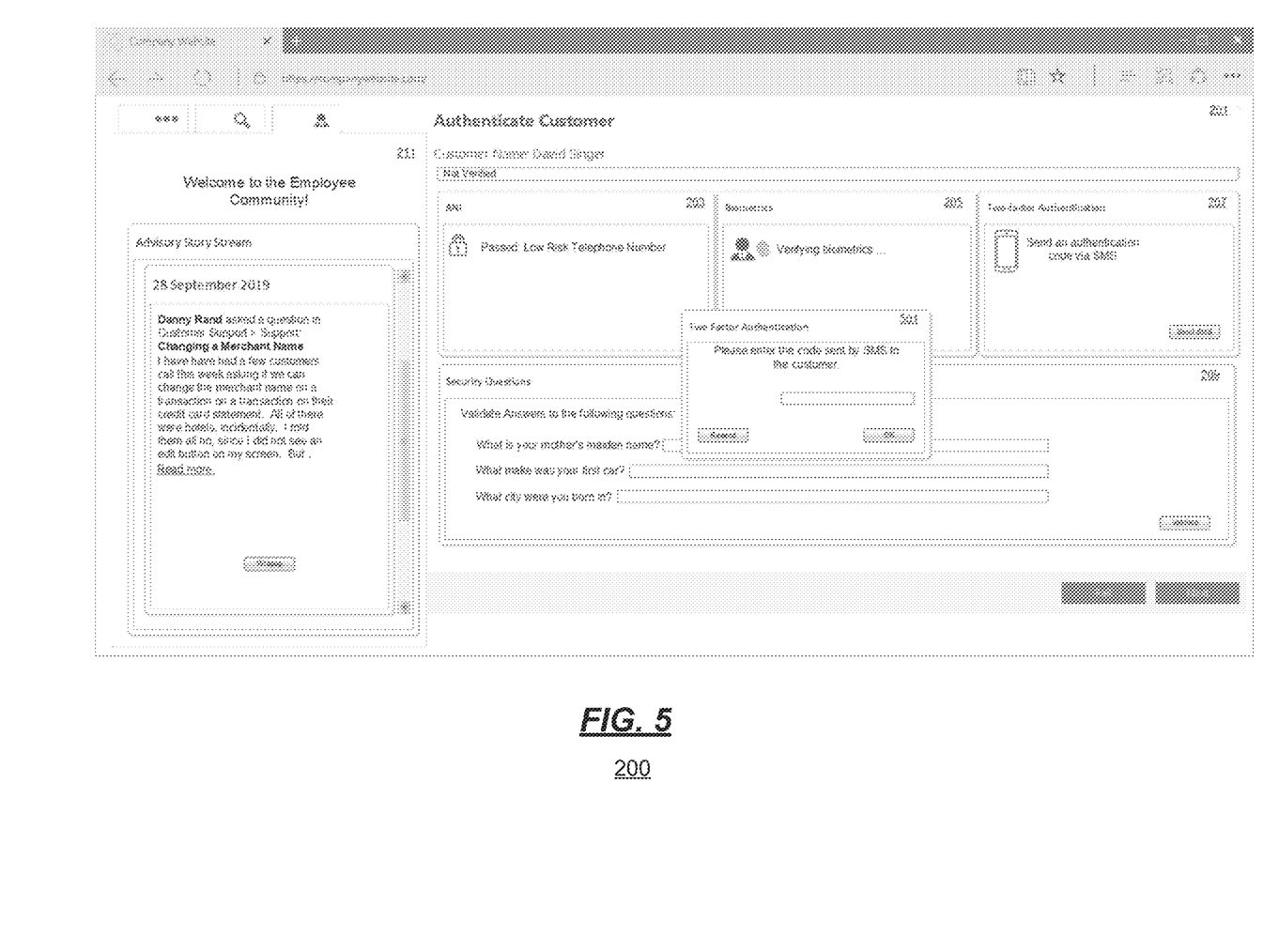

Continuing to FIG. 5, the authentication module 130 may have begun to perform two factor authentication on the call in response to the agent 152 pressing or selecting the button labeled "send SMS" in the window 207. In response, the authentication module 130 may have generated a code 131 and may have sent the code 131 (via SMS) to a number associated with the user 102 (i.e., "David Singer"). After sending the code 131, a window 501 was displayed in the user-interface 200 asking the agent to enter a code 131 spoken by the user 102 to the agent 152. Because the spoken and sent codes will match only if the user 102 also has access to the computing device 105 (e.g., smartphone) associated with the number that the code 131 was sent to, if the user 102 provides a matching code 131 to the agent 152, then the authentication module 130 may assume that the user 102 is who they purport to be (i.e., "David Singer").

Figure 6:
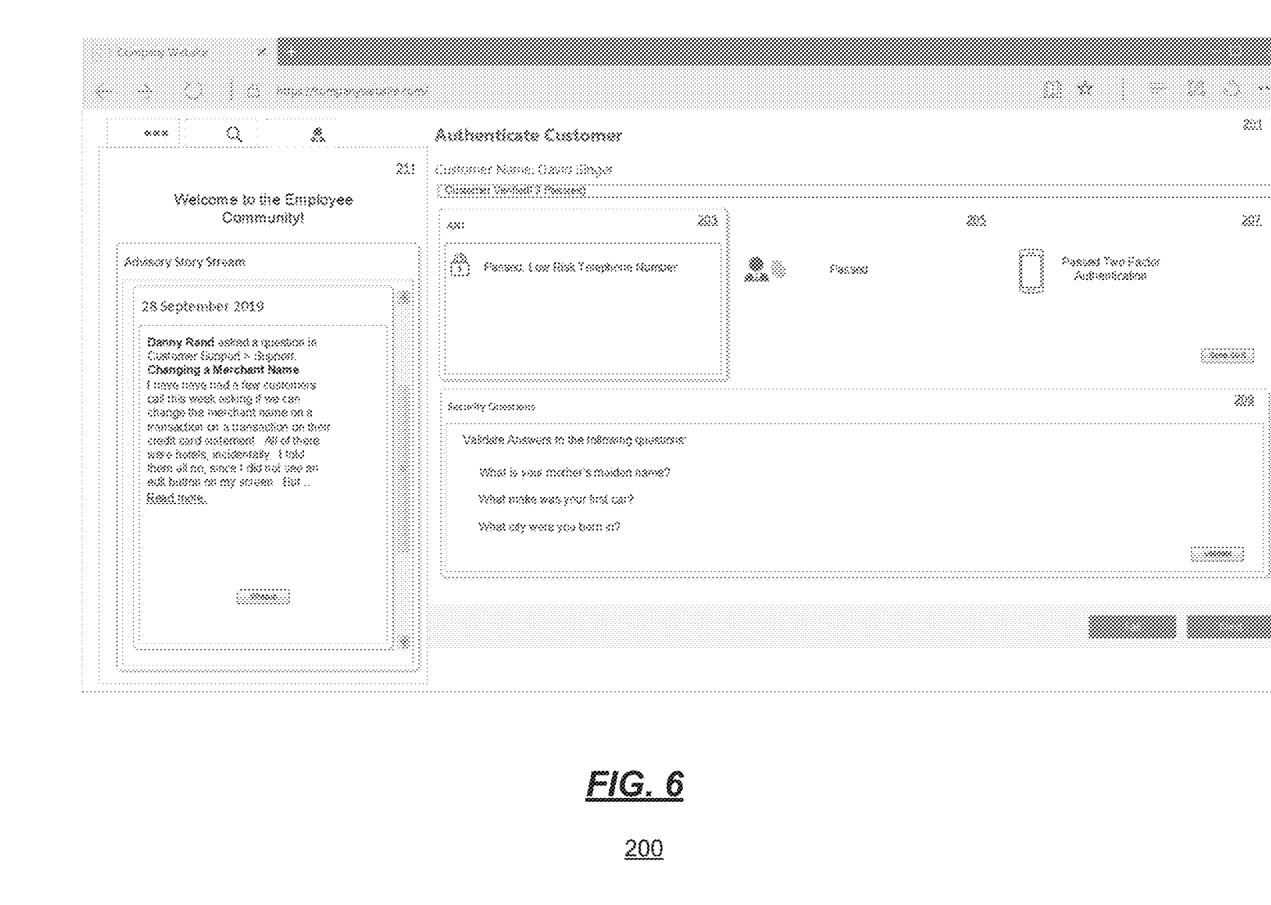

Continuing to FIG. 6, the codes 131 matched and the window 207 has been updated by the authentication module 130 to show that the user 102 "Passed two factor authentication." Because the user 102 was successfully authenticated using the methods associated with the windows 203, 205, and 207, the agent 152 may not be required to authenticate using the security questions shown in the window 209.

Figure 7:
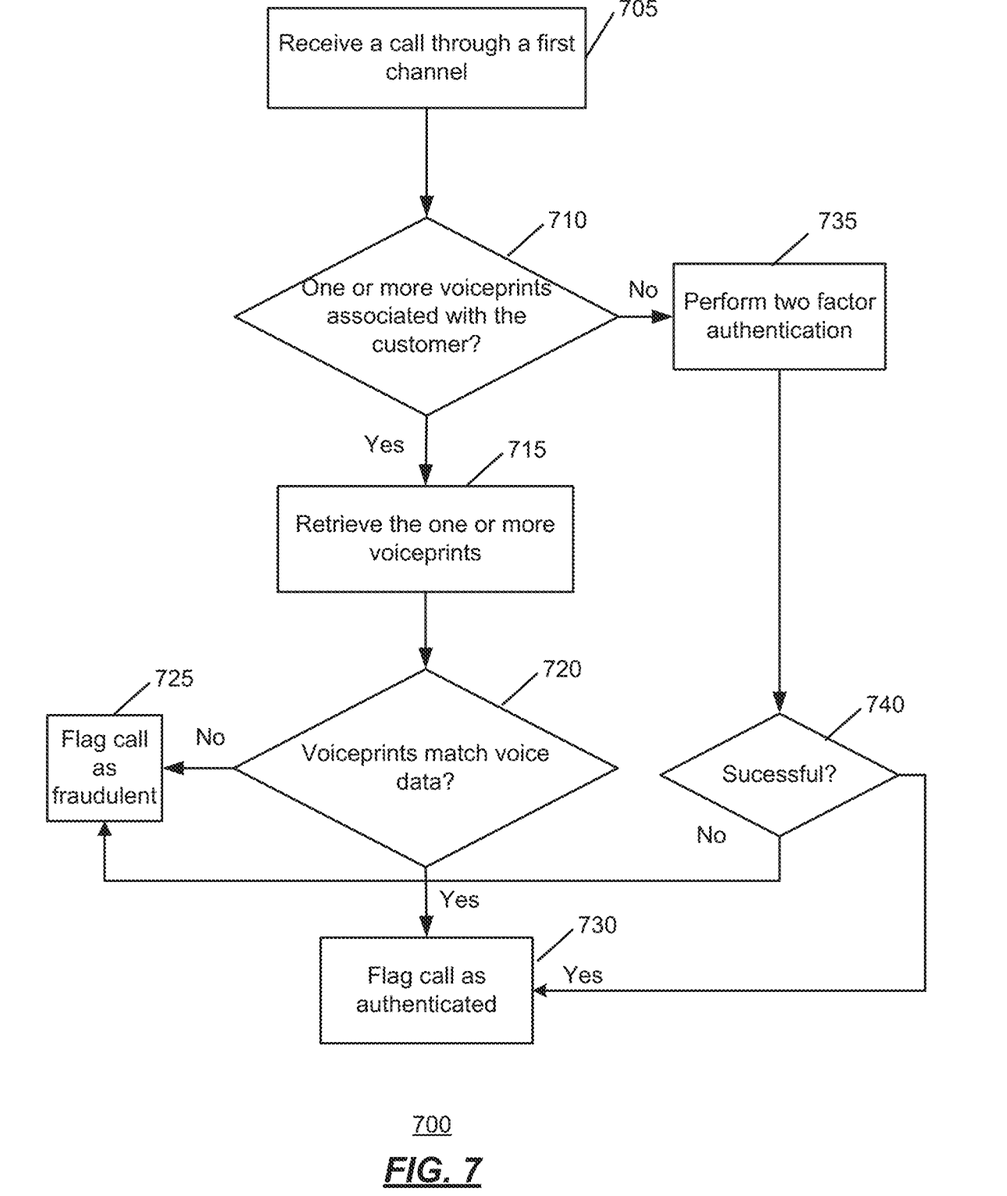
FIG. 7 is an illustration of an example method for authenticating users and/or identifying fraudulent users.

FIG. 7 is an illustration of an example method 700 for authenticating users and/or identifying fraudulent users. The method 700 may be implemented by one or more of the biometrics module 120, the authentication module 130, and the fraud module 140 of the computing device 110. The method 700 may be implemented in a call center.

At 705, a call is received through a first channel. The call may be received by an agent computing device 155 associated with an agent 152. The call may be associated with a customer (i.e., a user 102) and a speaker. The speaker may be the person speaking on the call, and the customer may be the user 102 that the speaker purports to be. Depending on the embodiment, the speaker may have identified themselves as the customer to an IVR system, and/or may have identified themselves as the customer to the agent 152. The first channel 108 may be a telephone line such as a cellular phone, a VoIP phone, or a POTS phone. Other channels 108 may be used.

At 710, whether there are one or more voiceprints 121 associated with the customer is determined. The determination may be made by the biometrics module 120. Depending on the embodiment, the biometrics module 120 may store voiceprints 121 for customers as well as known fraudulent users. If there are one or more voiceprints 121 associated with the customer, then the method 700 may continue at 715. Else the method 700 may continue at 735.

At 715, the one or more voiceprints 121 are retrieved. The one or more voiceprints 121 may be retrieved by the biometrics module 120 from a profile associated with the customer or user, for example.

At 720, a determination is made as to whether any of the one or more voiceprints 121 match voice data associated with the call. The determination may be made by the biometrics module 120. The voice data may comprise various words and phrases spoken by the speaker to one or both of the IVR system or the agent 152. Any method for matching voiceprints 121 against voice data may be used. If any of the voiceprints 121 match the voice data, the method 700 may continue at 730.

As may be appreciated, if the voce data matches any of the voiceprints 121 associated with the speaker, then the biometrics module 120 can be assured that the speaker is the customer that they purport to be. Accordingly, no further authentication (such as two factor or security questions) may be necessary for the call. By reducing the amount of authentication that is required, the call experience of the customers is improved, and the total amount of time spent per call by agents 152 is reduced.

At 725, the call is flagged as fraudulent. The call may be flagged as fraudulent by one or both of the biometrics module 120 or the authentication module 130. In response to flagging the call as fraudulent, the call may be transferred to an agent 152 that specializes in fraudulent calls. In addition, a recording of the call, and other information about the call such as characteristics 117 of the call, may be sent to the fraud module 140. The fraud module 140 may analyze the recording of the call and the information about the call to try to determine one or more or rules that can be used to identify fraudulent calls or fraudulent users 102. In addition, the fraud module 140 may identify trends in fraudulent call activity and may share any information learned with other call centers or other company divisions or subsidiaries. Depending on the embodiment, one or more voiceprints 121 may be generated from the recorded call and may be added to a group of voiceprints 121 that are known to be associated with fraudulent users 102.

At 730, the call is flagged as authenticated. The call may be flagged as authenticated by one or both of the biometrics module 120 or the authentication module 130. After the call is authenticated, the agent 152 may proceed with addressing the reason that the customer initiated the call in the first place.

At 735, two factor authentication is performed. The two factor authentication may be performed by the authentication module 130. Because there was no voiceprint 121 associated with the customer, the authentication module 130 may authenticate the speaker using two factor authentication. Depending on the embodiment, the authentication module 130 may send a code 131 to the speaker using a second channel 108 that is indicated in a profile associated with the customer. Other methods for authentication such as security questions may be used if two factor authentication is not available. For example, a user 102 may not have set up two factor authentication yet.

At 740, whether the authentication was successful is determined. The determination may be made by the authentication module 130. For two factor authentication, the authentication is successful when the speaker speaks the correct code 131 back to the agent 152. For authentication based on security questions, the authentication is successfully when the speaker provided the correct answers to the security questions. If the authentication was successful, then the method 700 may proceed to 730 where the call may be flagged as authenticated. If the authentication was not successful, the method 700 may proceed to 725 where the call may be flagged as fraudulent.

Figure 8:
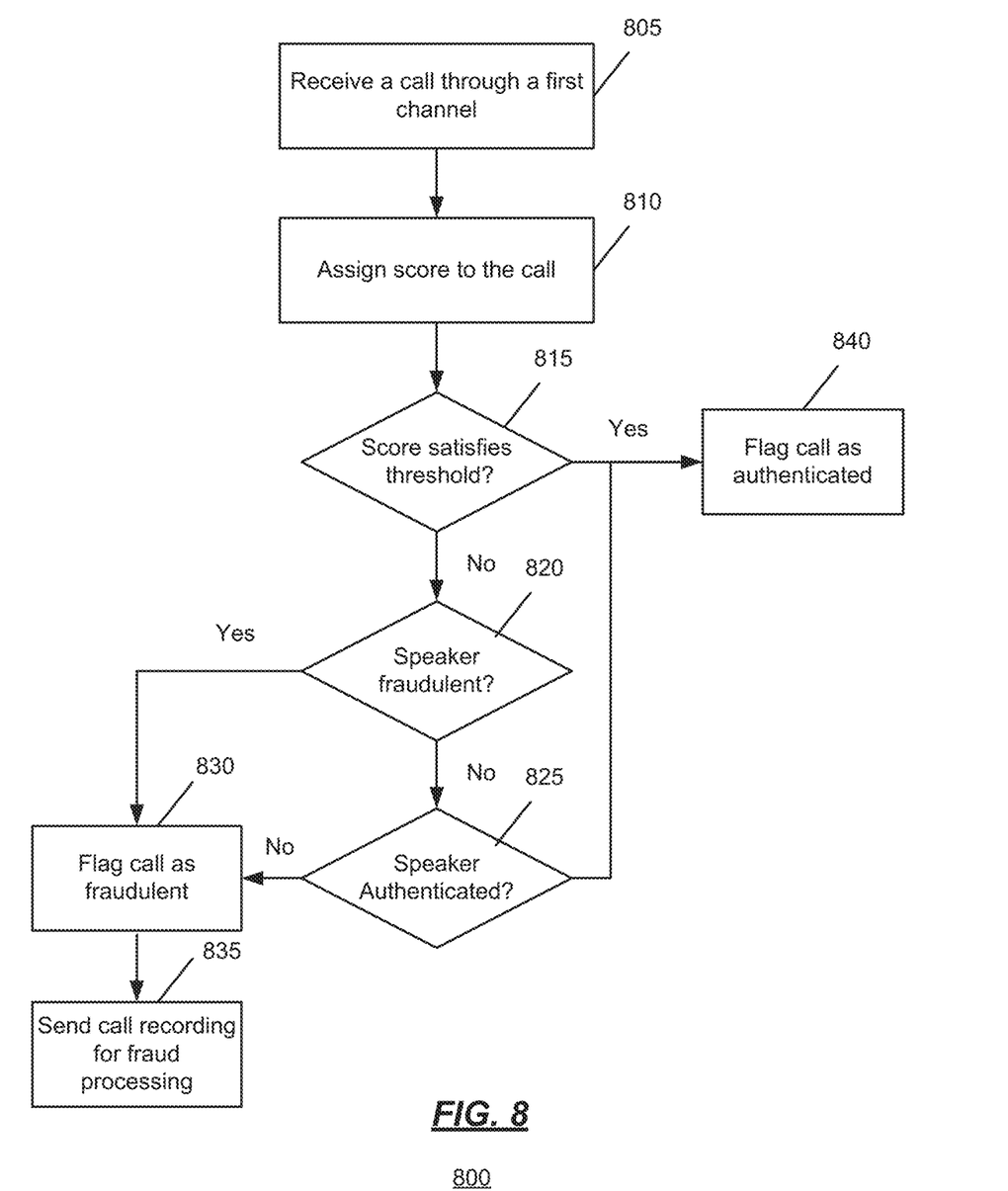
FIG. 8 is an illustration of an example method for authenticating users and/or identifying fraudulent users.

FIG. 8 is an illustration of an example method 800 for authenticating users and/or identifying fraudulent users. The method 800 may be implemented by one or more of the analytics module 115, the biometrics module 120, the authentication module 130, and the fraud module 140 of the computing device 100. The method 800 may be implemented in a call center.

At 805, a call is received through a first channel. The call may be received by an agent computing device 155 associated with an agent 152. The call may be associated with a customer (i.e., a user 102) and a speaker. The speaker may be the person speaking on the call, and the customer may be the user 102 that the speaker purports to be. Depending on the embodiment, the speaker may have identified themselves as the customer to an IVR system, and/or may have identified themselves as the customer to the agent 152. The first channel 108 may be a telephone line such as a cellular phone, a VoIP phone, or a POTS phone. Other channels 108 may be used.

At 810, a score is assigned to the call. The score 118 may be assigned to the call by the analytics module 115 based on one or more characteristics 117 of the call. Depending on the embodiment the characteristics 117 may include knowledge-based characteristics 117, reputation-based characteristics 117, and behavior-based characteristics 117. Other characteristics 117 may be considered. Example characteristics include the number of calls associated with the number, the number of calls associated with the customer or user 102, carrier information, the type of channel 108 used, call origin, ANI information, IVR information, PBX information, call velocity, and cross platform detection. Other characteristics 117 may be used.

At 815, a determination as to whether the score 118 satisfies a threshold is determined. The determination may be made by the analytics module 115. If the score satisfies the threshold (e.g., is less than the threshold), the method 800 may continue at 840. Else, the method 800 may continue at 820.

At 820, a determination is made as to whether the call is associated with a fraudulent speaker. The determination may be made by the biometrics module 120 by comparing voice data associated with the call with voiceprints 121 known to be associated with fraudulent speakers. If any of the voiceprints 121 match the method 800 may continue at 830. Else, the method 800 may continue at 825.

At 825, a determination is made as to whether the speaker is authenticated. The determination may be made by the biometrics module 120 and/or the authentication module 130. In some implementations, the biometrics module 120 may authenticate the speaker by comparing voice data associated with the call with voiceprints 121 known to be associated with the user 102 corresponding to the speaker. Alternatively or additionally, the authentication module 130 may authenticate the speaker using two factor authentication. If the speaker is authenticated the method 800 may continue at 840. Else, the method 800 may continue at 830.

At 830, the call is flagged as fraudulent. The call may be flagged as fraudulent by any of the analytics module 115, the biometrics module 120, or the authentication module 130.

At 835, the call is sent for fraud processing. The call, including any information about the call and a recording of the call, may be sent to the fraud module 140 for fraud processing. The fraud processing may include analyzing the recording of the call and the information about the call to try to determine one or more or rules that can be used to identify fraudulent calls or fraudulent users 102. In addition, the fraud module 140 may identify trends in fraudulent call activity and may share any information learned with other call centers or other company divisions or subsidiaries. Depending on the embodiment, one or more voiceprints 121 may be generated from the recorded call and may be added to the voiceprints 121 that are known to be associated with fraudulent users 102.

At 840, the call is flagged as authenticated. The call may be flagged as authenticated by one or more of the analytics module 115, the biometrics module 120, or the authentication module 130. After the call is authenticated, the agent 152 may proceed with addressing the reason that the customer initiated the call in the first place.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 1300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for authenticating calls and for preventing fraud comprising:
   one or more processors;
   a memory communicably coupled to the one or more processors and storing:
      an analysis module including instructions that when executed by the one or more processors cause the system to:
         receive a call through a first channel, wherein the call is associated with a customer and a speaker;
         based on one or more characteristics of the received call, the customer, or the channel, assign a score to the call;
         determine if the score satisfies a threshold; and
         if the score does not satisfy the threshold, flag the call as a fraudulent call;
      a biometrics module including instructions that when executed by the one or more processors cause the one or more processors to:
         analyze voice data associated with the call to determine whether the speaker is a fraudulent speaker; and
         if the speaker is a fraudulent speaker, flag the call as a fraudulent call; and
      an authentication module including instructions that when executed by the one or more processors cause the system to:
         determine that there are no voiceprints associated with the customer; and
         in response to the determination that no voice prints are associated with the customer:
            perform authentication of the customer;
            determine if the customer is successfully authenticated; and
            if it is determined that the customer is successfully authenticated, flag the call as an authenticated call.

2. The system of claim 1, wherein the analysis module further includes instructions that when executed by the one or more processors cause the system to:
   if the score satisfies the threshold, flag the call as an authenticated call.

3. The system of claim 1, wherein the biometrics module further includes instructions that when executed by the one or more processors cause the system to:
   if the speaker is not a fraudulent speaker, flag the call as an authenticated call.

4. The system of claim 1, wherein the authentication module further includes instructions that when executed by the one or more processors cause the system to:
   if it is determined that the first code does not match the second code, flag the call as a fraudulent call.

5. The system of claim 1, further comprising a fraud module including instructions that when executed by the one or more processors cause the system to:
   if the call is flagged as a fraudulent call;
   receive a recording of the call;
   process the recording to generate one or more voiceprints for the speaker associated with the call; and
   store the generated voiceprints.

6. The system of claim 1, wherein the biometrics module further includes instructions that when executed by the one or more processors cause the system to:
   retrieve voiceprints associated with fraudulent activities;
   determine if the voice data matches any of the voiceprints associated with fraudulent activities; and
   if the determined voice data matches any of the voiceprints associated with the fraudulent activities, flag the call as a fraudulent call.

7. The system of claim 1, wherein the biometrics module further includes instructions that when executed by the one or more processors cause the system to:
   retrieve one or more voiceprints associated with the customer;
   determine if the voice data matches any of the voiceprints associated with the customer; and
   if the determined voice data matches any of the voiceprints associated with the customer, flag the call as an authenticated call.

8. A method for authenticating calls and for preventing fraud comprising:
   receiving a call through a first channel by a computing device, wherein the call is associated with a customer and a speaker;
   determine if there are one or more voiceprints associated with the customer by the computing device;
   if it is determined that there are one or more voiceprints associated with the customer:
      retrieving the one or more voiceprints associated with the customer by the computing device;
      determining if voice data associated with the call matches any of the one or more voiceprints associated with the customer by the computing device; and
      if the voice data matches any of the one or more voiceprints associated with the customer, flagging the call as an authenticated call by the computing device; and
   if it is determined that that there are no voiceprints associated with the customer;
      in response to the determination that no voice prints are associated with the customer:
      performing authentication of the customer;
      determining if the customer is successfully authenticated; and
      if it is determined that the customer is successfully authenticated, flagging the call as an authenticated call.

9. The method of claim 8, further comprising:
if the voice data does not match any of the one or more voiceprints associated with the customer, flagging the call as a fraudulent call.

10. The method of claim 8, wherein performing authentication of the customer comprises:
generating a first code;
receiving a second code;
determining if the first code matches the second code; and
if it is determined that the first code matches the second code, determining that the customer is successfully authenticated.

11. The method of claim 8, wherein the method is implemented in a call center.

12. A method for authenticating calls and for preventing fraud comprising:
receiving a call through a first channel by a computing device, wherein the call is associated with a customer and a speaker;
based on characteristics of the received call, the customer, and the channel, assigning a score to the call by the computing device;
determining if the score satisfies a threshold by the computing device;
if the score does not satisfy the threshold, flagging the call as a fraudulent call by the computing device;
determining that that there are no voiceprints associated with the customer;
in response to the determination that no voice prints are associated with the customer:
performing authentication of the customer;
determining if the customer is successfully authenticated; and
if it is determined that the customer is successfully authenticated, flagging the call as an authenticated call.

13. The method of claim 12, further comprising:
if the score satisfies the threshold, flagging the call as an authenticated call.

14. The method of claim 12, further comprising:
analyzing voice data associated with the call to determine whether the speaker is a fraudulent speaker;
if the speaker is a fraudulent speaker, flagging the call as a fraudulent call.

15. The method of claim 12, wherein the method is implemented in a call center.

16. The method of claim 14, wherein analyzing voice data associated with the call to determine whether the speaker is a fraudulent speaker comprises:
retrieving voiceprints associated with fraudulent activities;
determining if the voice data matches any of the voiceprints associated with fraudulent activities; and
if the determined voice data matches any of the voiceprints associated with the fraudulent activities, flagging the call as a fraudulent call.

17. The method of claim 12, wherein performing authentication of the customer comprises:
generating a first code;
receiving a second code;
determining if the first code matches the second code; and
if it is determined that the first code matches the second code, determining that the customer is successfully authenticated.

18. The method of claim 17, further comprising:
if it is determined that the first code does not match the second code, flagging the call as a fraudulent call.

19. The method of claim 12, further comprising:
if the call is flagged as a fraudulent call:
receiving a recording of the call;
processing the recording to generate one or more voiceprints for the speaker associated with the call; and
storing the generated one or more voiceprints.

* * * * *